June 7, 1938.
W. RITZERFELD
MANIFOLDING MACHINE
Original Filed May 9, 1931
Re. 20,753
Orig. 1,990,349
2 Sheets-Sheet 1
Reverse drum rotation opens master clamp.
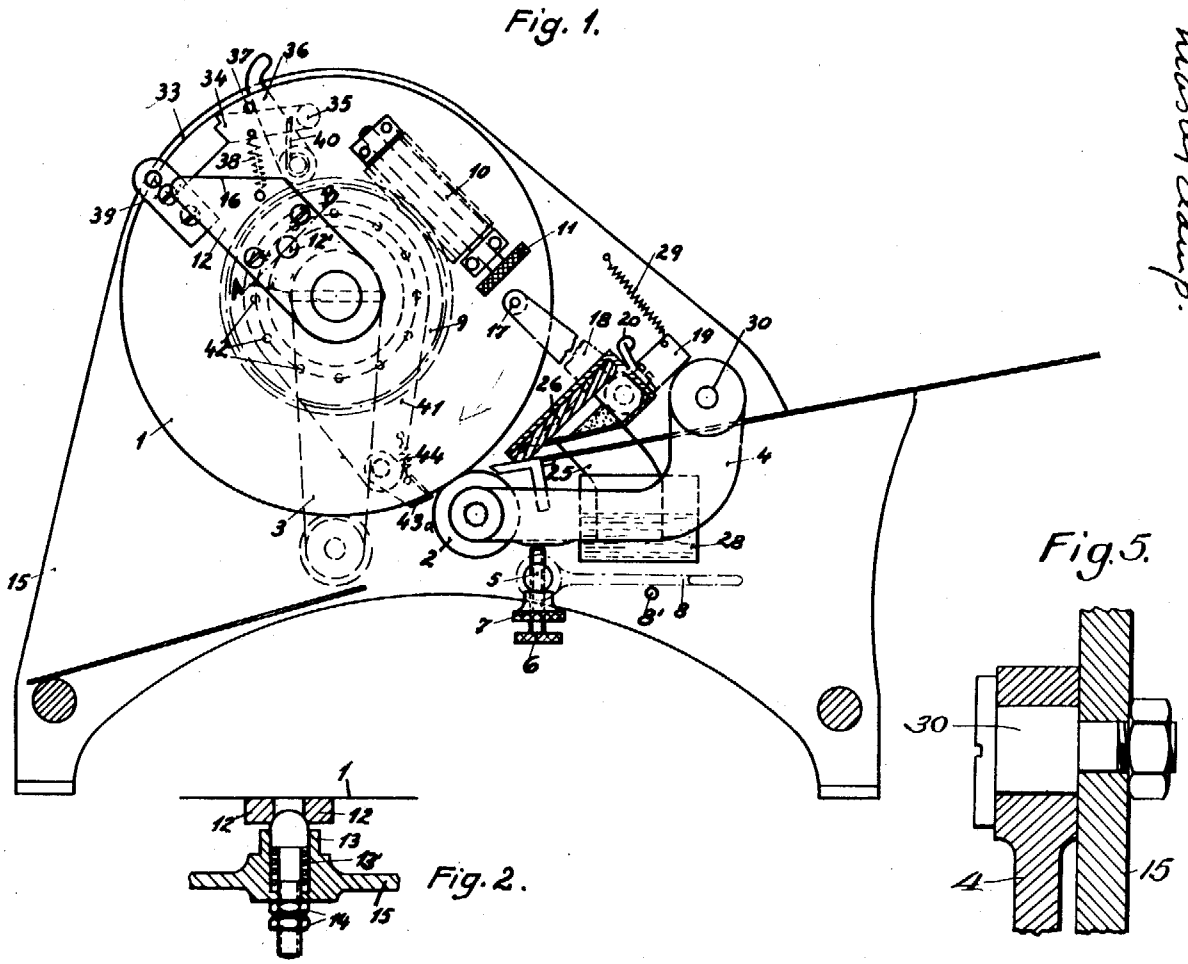
Inventor
Wilhelm Ritzerfeld
By B. Singer, atty.

June 7, 1938. W. RITZERFELD Re. 20,753

MANIFOLDING MACHINE

Original Filed May 9, 1931 2 Sheets-Sheet 2

Inventor
Wilhelm Ritzerfeld
By B. Singer, Atty

101, PRINTING.

132.5

Examin

Reissued June 7, 1938

Re. 20,753

UNITED STATES PATENT OFFICE 20,753

MANIFOLDING MACHINE

Wilhelm Ritzerfeld, Berlin, Germany

Original No. 1,990,349, dated February 5, 1935, Serial No. 536,255, May 9, 1931. Renewed June 27, 1934. Application for reissue January 8, 1938, Serial No. 184,103. In Germany January 23, 1930

31 Claims. (Cl. 101—132)

The present invention relates to a machine for manifolding papers, documents, drawings and the like by means of an original printing plate or stencil sheet carrying the text to be printed in copyable mirror-writing. The text is printed on sheets or webs, which previously have been moistened with a rapidly volatilizing fluid which easily and uniformly absorbs the printing ink without attacking the sheet or web. The moistening procedure is hereby performed in such a manner, that only an extremely thin film of fluid is applied to the sheet. The original copyable sheet, carrying the text to be printed in mirror-letters, is clamped to a printing cylinder and the sheets to be printed upon are moistened by means of a moistening device and are thereupon fed between the printing cylinder and a pressure roller. By means of this machine it is possible to produce a great number of exact and clear copies.

The machine according to the invention is of very simple construction and may therefore be manufactured at lower costs than the manifolding machines hitherto known. The novel machine may also be handled with greater ease than the complicated machines hitherto used.

An important feature of the present invention is the clamping device by means of which the original copyable sheet is fixed to the printing cylinder. I have found, that it in the most cases is sufficient to fix one of the ends of the original mirror-writing copyable sheet to the printing cylinder. According to the invention the clamping device comprises a deflectable or pivotal clamping member, which in operative position lies flush with the surface of the printing cylinder.

Hitherto it was necessary to open and close the clamping device manually. According to the present invention the clamping device is opened and closed automatically in that the opening is performed by imparting a partial backward rotation to the cylinder, whereas the closing is performed by rotating the cylinder from its normal position forwardly. It should however be understood, that it is also within the scope of the invention to so arrange the clamping device that it may be opened and closed manually.

If it is desired to clamp both ends of the copyable sheet to the printing cylinder the other end of the sheet may be clamped by means of a clip or the like, which may be adjusted and locked in any desired position on the periphery of the printing cylinder. By means of this clip copyable sheets of different lengths may be clamped to the cylinder.

The printing cylinder may at any moment be brought back into its original position when it is desired to fill out schedules or printed forms on previously arranged lines.

The pressure which the pressing roller exerts on the printing cylinder may be adjusted as required and the pressing roller may be also adjusted. The pressing roller may also be adjusted in a horizontal direction in relation to the printing roller in order to compensate for inaccuracies created during the mounting of the machine. The pressure between the cylinder and the pressing roller may at any moment be released by means of a special device.

In the hitherto known manifolding machines great difficulties are encountered in exchanging the moistening strip projecting from the receptacle in which the moistening fluid is stored. This strip, which usually consists of felt or the like, is rapidly worn and becomes damaged and must therefore frequently be exchanged. In the known machines the entire moistening device must be removed from the machine and be dismounted before the moistening strip can be exchanged. According to the present invention the moistening strip can be easily exchanged by a simple manipulation without separating the moistening device from the machine.

In the manifolding machines hitherto known the fluid for moistening the sheets to be printed upon is fed to the fluid receptacle of the moistening device from a dropping container the outlet of which may be opened or completely or partially closed by the operator. This container is arranged at one side of the machine and at a higher level than the latter. If inadvertently more fluid is fed into the fluid receptacle than the filler in the same is able to absorb the fluid will flow over the rim of the receptacle and too much fluid will be applied to the sheets to be printed upon, so that blurred prints will be obtained. According to the present invention this objection is avoided by arranging the container in which the fluid is stored below the machine and feeding the fluid to the moistening device through a wick or the like. The fluid receptacle is filled with an absorbent, for instance with felt or cotton.

By this arrangement only so much fluid will be drawn from the container as the material in the fluid receptacle is able to absorb and to distribute and the surface of the sheets to be printed upon will be uniformly covered with an extremely thin film of fluid. The supply of fluid may be interrupted by lifting the wicks out of the container or by lowering the container until the wicks are completely separated from the fluid stored therein.

It may sometimes occur that the sheet to be printed upon is wrinkled and in this case the moistening strips may be damaged. According to the invention therefore a special device is provided by means of which the fluid container may be manually lifted from the sheet and the printing cylinder and the pressing roller may be separated from each other, so that the wrinkled sheet may be removed before any damage has been done.

A constructional form of the invention is shown schematically by way of example in the accompanying drawings, in which Fig. 1 is a lateral sectional view of the complete machine.

Fig. 2 is a sectional view showing the adjusting or setting mechanism.

Fig. 5 is a detail sectional view of one of the bell crank levers, the frame and the bearing bolt.

Figure 3:
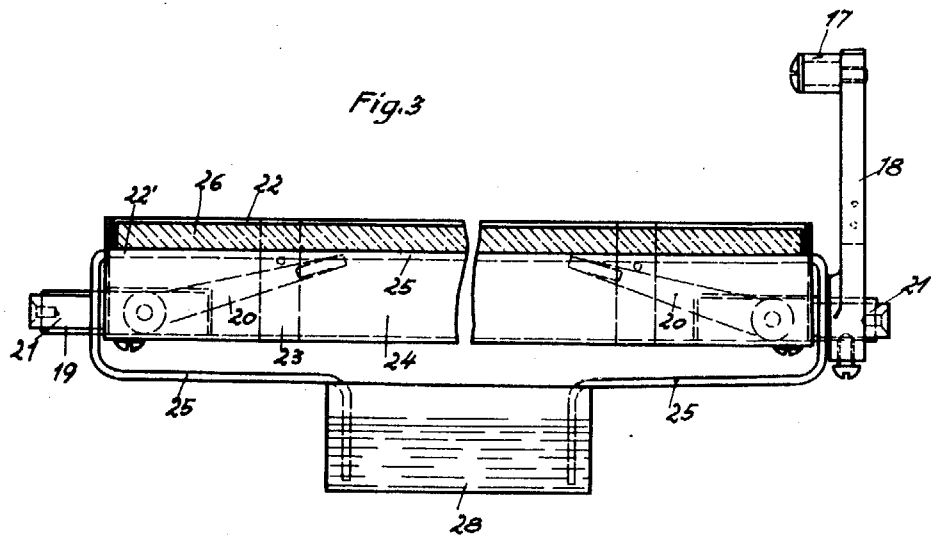
Fig. 3 is a front view of the moistening device.

1 denotes the printing cylinder, the shaft of which is arranged in bearings in the lateral frame members 15 of the machine. The cylinder is loosely arranged on its shaft and is rotated by means of a handle or crank 3.

The printing cylinder is adjustably arranged, so that the printing level may be regulated and the printing may take place on lines previously formed on the sheet. By means of a worm 10—11 and a worm wheel 9 the printing cylinder may be adjusted within certain limits, so that the printing operation commences at a predetermined moment. The worm wheel 9 carries the control member 12 with the control opening 12'. After each revolution the cylinder 1 is arrested exactly in the same position by a pin 13 snapping into the aperture 12'. The pin 13 is operated by the spring 13' the pressure of which may be regulated by means of the nuts 14.

The pressing roller 2 is rotatably arranged in bell crank levers 4, which are pivotally arranged on the eccentric bearing pins of threaded bolts 30. The bolts 30 are seated in the lateral frame members 15 of the machine. The pressing roller may be adjusted toward and from the printing cylinder by means of the bolts 30. The pressure of the roller 2 against the cylinder 1 and the vertical position of the roller 2 may be regulated by means of the set screws 6. The screws are held securely in the chosen position by means of lock nuts 7. In order to relieve the cylinder 1 from the pressure exerted by the roller 2 without altering the setting of the screws 6 the latter are carried by a shaft 5 which is arranged in bearings in the members 15. This shaft may by means of a lever 8 be deflected upward, whereby the roller 2 is separated from the cylinder 1. The roller 2 may again be brought into engagement with the cylinder 1 by lowering the lever 8 until it abuts against the stop 8'.

Figure 4:
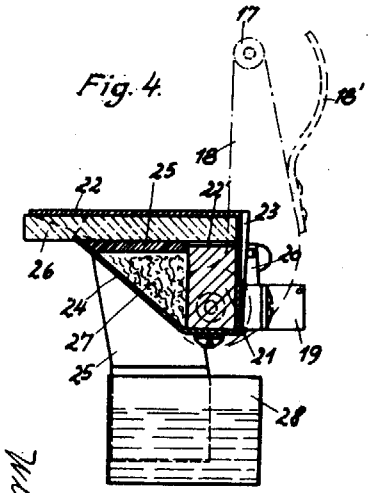
Fig. 4 is a sectional side view of the moistening device.

Figs. 3 and 4 show a preferred constructional form of the moistening device according to the invention. The moistening strip 26 is held by a carrier 22 of sheet metal or the like. The carrier 22 is somewhat more bent than required on account of its connection with the cross piece 21 to which it is fastened and the moistening strip 26 will therefore by the carrier 22 be resiliently pressed against the lower part 24 of the fluid receptacle whereby the strip 26 is held in a fixed position. The carrier 22 is fixed to the cross-piece 21 by means of a lever 20, which is adapted to be brought into engagement with the wedge-shaped faces 23. The lower part 24 of the carrier is fixed to the cross piece so that a closed container is formed and the moistening strip 26 projects from the narrowed end of this container. The carrier 22 is bent outward at its ends, whereby a guide 22' for the strip 26 is formed. The empty space in the fluid receptacle is filled with an absorbent material for instance with a body of felt or the like which is formed after the interior of the receptacle. The receptacle will therefore always contain a certain amount of fluid and this fluid will be evenly distributed. The cross piece 21, which is deflectably arranged between the lateral frame members 15, carries a control lever 18 by means of which the moistening device is lifted when the wheel 17 rolls over the curved part 16 of the control member 12. As soon as the printing cylinder 1 is rotated the wheel 17 leaves the control member 16 and the front end of the moistening device is lowered onto the sheet under the influence of the springs 29. When a wrinkled sheet appears the moistening device is lifted by means of the handle 18' on the control lever 18 and the cylinder 1 is rotated in backward direction, whereupon the wrinkled sheet may be removed. Through the wicks 25 the fluid in the container 28 is sucked into the fluid receptacle and on account of the absorbent material in the receptacle the fluid is rapidly and uniformly distributed in the moistening strip. If it is desired to interrupt the supply of fluid the wicks 25 may be lifted out of the container 28 or the container may be lowered until the wicks are separated from the fluid.

The original printing sheet or stencil sheet is placed on the cylinder 1 with the mirror-writing on the outside and one end of the sheet is clamped to the cylinder by means of the clamping bar 33 which is deflectably or pivotally arranged in bearings 39. The clamping device is opened and closed automatically. When an angular movement in backward direction is applied to the cylinder 1 the lever 34, which is fixed to the member 33 and carries the pin 35, will contact with the lever 36 and ride over the same, whereby it is lifted together with the clamping member 33, so that the original printing sheet may be inserted without difficulty. When a partial rotation in forward direction is imparted to the cylinder 1 the clamping lever 34 will again slide downward on the lever 36, and the clamping member 33 will by a spring 38 be pressed into a corresponding groove in the cylinder 1 and take up a position in which it lies flush with the periphery of the said cylinder. When the manifolding operation is started and the printing cylinder 1 performs a revolution the lever 34 with pin 35 will push the lever 36 aside, which by means of the spring 40 again is brought back into its normal position in which it rests on the pin 37.

On one or both end faces of the printing cylinder 1 a clamp holder 41 is rotatably arranged on the shaft of the cylinder. In this clamp holder a series of grooves or apertures 42 are arranged which are adapted to cooperate with a ball 43 resiliently seated in the member 41. By means of this arrangement the clamp position may be adjusted. The upper end of the clamp 43a is bent over the mantle face of the cylinder and is pressed against the same by the spring

NOT PRINTING.

Examiner 132.5

44. This arrangement serves for clamping the stencil sheet to the cylinder 1 at any desired point on the sides of the latter.

I claim:—

1. In a manifolding machine printing from an original copyable sheet carrying the matter to be manifolded in copyable mirror-writing and printing on sheets and similar bodies which are moistened with a rapidly volatilizing fluid, a printing cylinder, a pressing roller pressing the body to be printed upon against the original copyable sheet, means for rotating the said printing cylinder a device for clamping one edge of the copyable sheet to the printing cylinder, a second resilient device for clamping one edge of the copyable sheet to the printing cylinder and means for adjusting and locking said second clamping device comprising a clamp holder and resilient means adapted to fix the clamp holder detachably to the printing cylinder in any adjusted position.

2. In a manifolding machine printing from an original copyable sheet carrying the matter to be manifolded in copyable mirror-writing and printing on sheets and similar bodies which are moistened with a rapidly volatilizing fluid, a printing cylinder, a pressing roller pressing the body to be printed upon against the original copyable sheet, means for rotating the said printing cylinder, a device for clamping one edge of the copyable sheet to the printing cylinder and a receptacle containing the easily volatilizing fluid, said receptacle comprising a detachable part, which when removed will lay open the receptacle, so that the interior of the same may be inspected and the contents of same may be exchanged.

3. A manifolding machine as claimed in claim 2, having a hollow frame member adapted to receive the moistening strip projecting from the fluid receptacle, said member, being connected to a cross-piece in the receptacle, and so bent that the moistening strip is resiliently pressed against the lower part of the said receptacle.

4. A manifolding machine as claimed in claim 3, in which the hollow empty space in the fluid receptacle is filled with an absorbent body having substantially the same form as the hollow space which it fills out.

5. In a manifolding machine printing from an original copyable sheet carrying the matter to be manifolded in copyable mirror-writing and printing on sheets and similar bodies which are moistened with a rapidly volatilizing fluid, a printing cylinder, a pressing roller pressing the body to be printed upon against the original copyable sheet, means for rotating the said printing cylinder, a device for clamping one edge of the copyable sheet to the printing cylinder and a receptacle containing the easily volatilizing fluid, said receptacle comprising a detachable part, which when removed will lay open the receptacle, so that the interior of the same may be inspected and the contents of same may be exchanged and a storage container for the moistening fluid arranged at a lower level than the said fluid receptacle and connected to the same by means of a wick.

6. A manifolding machine as claimed in claim 5, having means by which the wick arrangement and the storage container may be separated from each other at will.

7. A manifolding machine as claimed in claim 3, having a manually operated device by means of which the fluid receptacle may be lifted from the matter to be printed upon when it is necessary to remove said matter.

8. In a manifolding machine of the class described, a frame 15, a revoluble printing cylinder 1 mounted in the frame, a clamping member 33 in the periphery of the cylinder and pivotally mounted thereon, said member having a lever 34 provided with a tappet pin 35, a spring to normally close said clamping member; a second lever 36 pivotally mounted on the frame for limited movement in one direction and arranged in the path of the tappet pin of the first named lever, so that the clamping member is opened by said levers on partial reverse rotation of the printing cylinder and a spring 40 to normally hold the second named lever in initial position.

9. In a manifolding machine in which sheets are to be printed on that have been previously moistened with rapidly volatilizing fluid from an original provided with reversed writing and copying ink, the combination of a printing drum, a pressure roller which presses the sheet to be printed on against the printing drum, a moistening device disposed in front of the drum and roller, means for rotating said printing drum, means for securing the original upon the printing drum, an arcuate release device for opening the said securing means, said securing means extending axially of the printing drum and being provided with a lever which cooperates with the arcuate release device.

10. In a manifolding machine in which sheets are to be printed on that have been previously moistened with a rapidly volatilizing fluid from an original provided with reversed writing and copying ink, the combination which comprises a printing drum, a counterpressure roller for pressing copy sheets against the original, means for rotating said printing drum, clamping means for holding only one edge of said original to said printing drum, a moistening device for supplying copy sheets with a rapidly volatilizing fluid, said device including a container having parts arranged in such a manner that a moistening felt protrudes therefrom and having a removable part which when removed will expose the interior thereof for inspection and for replacement of felt and the like, a reservoir for the moistening fluid to be supplied to said moistening device, and means connecting said reservoir to said device for feeding fluid to said device.

11. In a manifolding machine in which sheets are to be printed on that have been previously moistened with a rapidly volatilizing fluid from an original provided with reversed writing and copying ink the combination which comprises a printing drum, a counterpressure roller for pressing copy sheets against the original, means for rotating said printing drum, clamping means for holding only one edge of said original to said printing drum, a moistening device for supplying copy sheets with a rapidly volatilizing fluid, said device including a container having parts arranged in such manner that the removal of one of said parts will expose the interior of said container for inspection and for insertion or replacement of a moistening felt and the like, and a reservoir for the moistening fluid connected to said moistening device for feeding fluid thereto.

12. In a manifolding device in which sheets are to be printed on that have been previously moistened with a rapidly volatilizing fluid from an original provided with reversed writing and copying ink, the combination which comprises a printing drum, a counterpressure roller for pressing copy sheets against the original, means for rotating said printing drum, clamping means for holding only one edge of said original to said printing drum, and a moistening device for supplying copy sheets with a rapidly volatilizing fluid, said device including a container, a moistening felt projecting from said container, absorptive material filled in said container, and a removable part on said container which when removed will expose the interior thereof for inspection and for replacement of the moistening felt and the like.

13. In a manifolding machine in which sheets are to be printed on that have been previously moistened with a rapidly volatilizing fluid from an original provided with reversed writing and copying ink, the combination which comprises a printing drum, a counterpressure roller for pressing copy sheets against the original, means for rotating said printing drum, clamping means for holding only one edge of said original to said printing drum, a moistening device for copy sheets including a container having a removable part which when removed will expose the interior thereof for inspection and for replacement purposes, and means for raising and lowering said moistening device.

14. In a machine for duplicating on a clear sheet matter imprinted in reverse with copying ink on a master sheet, the combination comprising a tank containing a quickly volatilizing solvent liquid; means for conveying a definite quantity of said liquid to one face of the clear sheet; said means including a container, a moistening felt in said container and protruding therefrom, and a removable part on said container which when removed will expose the interior thereof for inspection and for replacement purposes; means for positioning and feeding successive clear sheets to contact and register with the imprinted face on the master sheet; and means to press the clear sheet against the master sheet to print thereon a duplicate of the matter imprinted on the master sheet.

15. In a manifolding machine in which sheets are to be printed on that have been previously moistened with a rapidly volatilizing fluid from an original provided with reversed writing and copying ink, the combination which comprises a printing drum, a counterpressure roller for pressing copy sheets against the original, means for rotating said printing drum, clamping means for holding only one edge of said original to said printing drum, a moistening device for supplying copy sheets with a rapidly volatilizing fluid and including a container; a moistening felt in said container; a removable part which when removed will expose the interior thereof for inspection and for replacement of felt and the like; a reservoir for the moistening fluid to be supplied to said device; and a wick connecting said reservoir to said device for feeding fluid to said device by capillary action.

16. In a manifolding machine in which sheets are to be printed on that have been previously moistened with a rapidly volatilizing fluid from an original provided with reversed writing and copying ink, the combination which comprises a printing drum, a counterpressure roller for pressing copy sheets against the original, means for rotating said printing drum; clamping means for holding the said original to said printing drum; means for opening and closing the said clamping means; and a moistening device including a container, a moistening felt protruding from said container and a removable part on said container which, when removed, will expose the interior thereof for inspection and replacement purposes.

17. In a manifolding machine in which sheets are to be printed on that have been previously moistened with a rapidly volatilizing fluid from an original provided with reversed writing and copying ink, the combination which comprises a printing drum, a counterpressure roller for pressing copy sheets against the original, means for rotating said printing drum; clamping means for holding one edge of said original to said printing drum; an automatic controlled mechanism for opening and closing said clamping means; and a moistening device including a reservoir for said rapidly volatilizing liquid, a container connected to said reservoir, a moistening felt protruding from the said container, and a removable part on said container which when removed will expose the interior thereof for inspection and replacement purposes.

18. In a manifolding machine printing from an original copyable sheet carrying the matter to be manifolded in copyable mirror-writing and printing on sheets and similar bodies which are moistened with a rapidly volatilizing fluid, the combination comprising a printing cylinder, a pressing roller to press the body to be printed upon against the original copyable sheet, means for rotating the said printing cylinder, means for clamping one edge of the copyable sheet to the printing cylinder, said clamping means extending in the peripheral surface of said cylinder in a direction parallel to the axis thereof and lying flush with said surface when in the closed position, and means for pivotally connecting one side of said clamping means to said cylinder.

19. In a manifolding machine printing from an original copyable sheet carrying the matter to be manifolded in copyable mirror-writing and printing on sheets and similar bodies which are moistened with a rapidly volatilizing fluid, the combination comprising a printing cylinder, a pressing roller to press the body to be printed upon against the original copyable sheet, means for rotating the said printing cylinder, means for clamping one edge of the copyable sheet to the printing cylinder, said clamping means having at least the front portion thereof lying flush with the peripheral surface of said cylinder when in the closed position, means for pivotally connecting one side of said clamping means to said cylinder, and means actuated by the rotation of said printing roller to open and to close said clamping means for the release and imprisonment of a copyable original.

20. In a manifolding machine printing from an original copyable sheet carrying the matter to be manifolded in copyable mirror-writing and printing on sheets and similar bodies which are moistened with a rapidly volatilizing solvent, the combination comprising a printing cylinder, a pressing roller to press the body to be printed against the original, means for rotating said printing cylinder, a clamping bar for clamping one edge of the copyable original to the printing cylinder, said clamping bar extending in the peripheral surface of said cylinder in a direction parallel to the axis thereof and at least the front portion thereof lying flush with said surface when in the closed position, bearings for pivotally supporting said clamping bar, an actuating lever for said clamping bar, a pin mounted on said actuating lever, and a stationary lever having a sliding surface thereon, said sliding surface being adapted to slideably engage said pin on the actuating lever during the rotation of said printing cylinder to open and to close said clamping bar for the release and imprisonment of a copyable original.

21. In a manifolding machine printing from an original copyable sheet carrying the matter to be manifolded in copyable mirror-writing and printing onto sheets and similar bodies which are moistened with a rapidly volatilizing fluid, the combination comprising a printing cylinder, a pressing roller to press the body to be printed upon against the original copyable sheet, means for rotating the said printing cylinder, means for clamping one edge of the copyable sheet to the printing cylinder, said clamping means having at least the front portion thereof lying flush with the peripheral surface of said cylinder when in the closed position, means for pivotally connecting one side of said clamping means to said cylinder, a control mechanism, and means operable by said control mechanism when operated to actuate said clamping device so that at a given angular position of said cylinder said clamping device is moved to its sheet releasing condition during the rotation of said cylinder whereby an imprisoned master sheet is released from said cylinder, said clamping device actuating means having means to automatically release said clamping device to imprison a second sheet on said cylinder whereby master sheets may be released and may be imprisoned by rotating said cylinder.

22. A machine of the character described comprising in combination a printing cylinder, means for continuously rotating said cylinder, a clamping device on said cylinder for securing one edge of a flexible master sheet to said cylinder, said clamping device having at least the front portion thereof lying flush with the surface of said cylinder when in the closed position, means for pivotally connecting one side of said clamping device to said cylinder, a control mechanism, and means operable by said control mechanism when operated to actuate said clamping device so that at a given angular position of said cylinder said clamping device is moved to its sheet releasing condition during the rotation of said cylinder whereby an imprisoned master sheet is released from said cylinder, said actuating means having means to automatically release and to close said clamping device to imprison a second sheet on said cylinder whereby master sheets may be released and may be imprisoned by rotating said cylinder.

23. A machine of the character described comprising in combination a printing cylinder, means for continuously rotating said cylinder, a clamping device on said cylinder for securing one edge of a flexible master sheet to said cylinder, said clamping device having at least the front portion thereof lying flush with the surface of said cylinder when in the closed position, means for pivotally connecting one side of said clamping device to said cylinder, a pressing roller to press the sheet to be printed onto against the master sheet, an actuating mechanism for opening and closing said clamping device, and means cooperating with said actuating mechanism so that at a given angular position of said cylinder said clamping device is moved to its sheet releasing condition during the rotation of said cylinder whereby an imprisoned master sheet is released from said cylinder, said actuating mechanism having means thereafter to automatically release and to close said clamping device to imprison a second sheet on said cylinder whereby master sheets may be released and may be imprisoned by rotating said cylinder.

24. A machine of the character described comprising in combination a printing cylinder, means for continuously rotating said cylinder, a clamping device on said cylinder for securing one edge of a flexible master sheet to said cylinder, said clamping device having at least the front portion thereof lying flush with the surface of said cylinder when in the closed position and being pivotally connected at one side to said cylinder, a pressing roller to press the sheet to be printed upon against the master sheet, an actuating mechanism including an actuating lever for opening and closing said clamping device, and means slidingly cooperating with said actuating lever so that at a given angular position of said cylinder said clamping device is moved to its sheet releasing condition during the rotation of said cylinder whereby an imprisoned master sheet is released from said cylinder, said actuating mechanism having means to automatically release and to close said clamping device to imprison a second sheet on said cylinder.

25. A machine of the character described comprising in combination a printing cylinder, means for continuously rotating said cylinder, a clamping device on said cylinder for securing one edge of a flexible master sheet to said cylinder, said clamping device having at least the front portion thereof lying flush with the surface of said cylinder when in the closed position and being pivotally connected at one side to said cylinder, a pressing roller to press the sheet to be printed upon against the master sheet, an actuating lever rigidly connected to said clamping device and being capable of opening and closing the same, means including a displaceable slide surface adapted to cooperate with said actuating lever so that at a given angular position of said cylinder said clamping device is moved to its sheet releasing condition during the rotation of said cylinder whereby an imprisoned master sheet is released from said cylinder, and means for thereafter automatically closing said clamping device to imprison a second master sheet on said cylinder whereby master sheets may be released and may be imprisoned by rotating said cylinder.

26. In a manifolding machine printing from an original copyable sheet carrying the matter to be manifolded in copyable mirror-writing and printing on sheets and similar bodies which are moistened with a rapidly volatilizing fluid, the combination comprising a printing cylinder, a pressing roller to press the body to be printed upon against the original copyable sheet, means for rotating the said printing cylinder, means for clamping one edge of the copyable sheet to the printing cylinder, said clamping means extending in the peripheral surface of said cylinder in a direction parallel to the axis thereof and lying flush with said surface when in the closed position, means for pivotally connecting one side of said clamping means to said cylinder, an operating mechanism actuated by a partial rotation of said printing cylinder for opening and closing said clamping means, said mechanism including an actuating lever sliding on an inclined surface for opening said clamping means and resilient means for closing said clamping means, and means for returning all elements of said operating mechanism into their normal position of rest after each rotation of said printing cylinder.

27. In a manifolding machine printing from an original copyable sheet carrying the matter to be manifolded in copyable mirror-writing and printing on sheets and similar bodies which are moistened with a rapidly volatilizing fluid, the combination comprising a printing cylinder, a pressing roller to press the body to be printed upon against the original copyable sheet, means for rotating the said printing cylinder, means for clamping one edge of the copyable sheet to the printing cylinder, said clamping means extending in the peripheral surface of said cylinder in a direction parallel to the axis thereof and lying flush with said surface when in the closed position, means for pivotally connecting one side of said clamping means to said cylinder, and means for adjusting said printing cylinder in its initial position, said adjusting means including a manually operated worm and worm wheel mechanism.

28. In a manifolding machine printing from an original copyable sheet carrying the matter to be manifolded in copyable mirror-writing and printing on sheets and similar bodies which are moistened with a rapidly volatilizing fluid, the combination comprising a printing cylinder, a pressing roller to press the body to be printed upon against the original copyable sheet, means for rotating the said printing cylinder, means for clamping one edge of the copyable sheet to the printing cylinder, said clamping means extending in the peripheral surface of said cylinder in a direction parallel to the axis thereof and lying flush with said surface when in the closed position, means for pivotally connecting one side of said clamping means to said cylinder, pivotally mounted arms for supporting said pressing roller, and lockable setting members adapted to cooperate with said arms to adjust the pressure of said pressing roller against said printing cylinder and the vertical position of said pressing roller.

29. In a manifolding machine printing from an original copyable sheet carrying the matter to be manifolded in copyable mirror-writing and printing on sheets and similar bodies which are moistened with a rapidly volatilizing fluid, the combination comprising a printing cylinder, a pressing roller to press the body to be printed upon against the original copyable sheet, means for rotating the said printing cylinder, means for clamping one edge of the copyable sheet to the printing cylinder, said clamping means extending in the peripheral surface of said cylinder in a direction parallel to the axis thereof and lying flush with said surface when in the closed position, means for pivotally connecting one side of said clamping means to said cylinder, pivotally mounted arms for supporting said pressing roller, lockable setting members adapted to co-operate with said pivotally arranged arms to adjust the pressure of said pressing roller against said printing cylinder and the vertical position of said pressing roller, and a manually operable device for deflecting said pressing roller from said printing cylinder without changing the adjustment of said setting members.

30. In a manifolding machine printing from an original copyable sheet carrying the matter to be manifolded in copyable mirror-writing and printing on sheets and similar bodies which are moistened with a rapidly volatilizing fluid, the combination comprising a printing cylinder, a pressing roller to press the body to be printed upon against the original copyable sheet, means for rotating the said printing cylinder, means for clamping one edge of the copyable sheet to the printing cylinder, said clamping means extending in the peripheral surface of said cylinder in a direction parallel to the axis thereof and lying flush with said surface when in the closed position, means for pivotally connecting one side of said clamping means to said cylinder, a pair of arms for supporting said pressing roller at one of their ends, and an adjustable threaded bolt having an eccentric bearing pin thereon for each of said arms to pivotally support the other end of said arms, the relative lateral position of said pressing roller with respect to the printing cylinder capable of being adjusted by turning said eccentric bolts.

31. In a manifolding machine printing from an original copyable sheet carrying the matter to be manifolded in copyable mirror-writing and printing on sheets and similar bodies which are moistened with a rapidly volatilizing fluid, the combination comprising a printing cylinder, a pressing roller to press the body to be printed upon against the original copyable sheet, means for rotating the said printing cylinder, means for clamping one edge of the copyable sheet to the printing cylinder, said clamping means extending in the peripheral surface of said cylinder in a direction parallel to the axis thereof and lying flush with said surface when in the closed position, means for pivotally connecting one side of said clamping means to said cylinder and operating means effective before the end of the rotation of the printing cylinder to open and to close said clamping means and thereby to effect the stretching and releasing of the copyable sheet.

WILHELM RITZERFELD.